United States Patent
Kikuchi

(10) Patent No.: US 8,928,500 B2
(45) Date of Patent: Jan. 6, 2015

(54) STATE DETERMINATION DEVICE, STATE DETERMINATION METHOD, AND PROGRAM

(75) Inventor: Naoki Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 510 days.

(21) Appl. No.: 13/403,439

(22) Filed: Feb. 23, 2012

(65) Prior Publication Data

US 2012/0235836 A1    Sep. 20, 2012

(30) Foreign Application Priority Data

Mar. 18, 2011   (JP) .................. 2011-060843

(51) Int. Cl.
*H03K 17/94*   (2006.01)
*G06F 3/041*   (2006.01)
*G06F 3/044*   (2006.01)

(52) U.S. Cl.
CPC .............. *G06F 3/0416* (2013.01); *G06F 3/044* (2013.01)
USPC ............. 341/20; 345/173; 345/174; 345/175; 345/176; 345/177; 345/178; 178/18.01; 178/18.02; 178/18.03; 178/18.04; 178/18.05; 178/18.06; 178/18.07; 178/18.08; 178/18.09; 178/18.1; 178/18.11

(58) Field of Classification Search
USPC ........ 341/20; 345/173–178; 178/18.01–18.11
See application file for complete search history.

(56) References Cited

FOREIGN PATENT DOCUMENTS

JP    2010-250770    11/2010

*Primary Examiner* — Daniel Wu
*Assistant Examiner* — Frederick Ott
(74) *Attorney, Agent, or Firm* — Oblon, Spivak, McClelland, Maier & Neustadt, L.L.P.

(57) ABSTRACT

There is provided a state determination device including an input point acquisition section which acquires position information of an input point specified by an operating object, a reference region setting section which sets a reference region including the input point acquired by the input point acquisition section at a current time point, an input point-number acquisition section which acquires a number of input points acquired by the input point acquisition section in past and included in the reference region, and a determination section which determines, based on the number of input points acquired by the input point-number acquisition section, whether the operating object is in a moving state or in a still state.

11 Claims, 7 Drawing Sheets

| TIME | t1 | t2 | t3 | t4 | t5 |
|---|---|---|---|---|---|
| NUMBER OF INPUT POINTS | 0 | 0 | 1 | 2 | 3 |

| TIME | t1 | t2 | t3 | t4 | t5 |
|---|---|---|---|---|---|
| NUMBER OF INPUT POINTS | 0 | 0 | 1 | 1 | 1 |

X1 X2 X3 X4 X5    10: FIRST ELECTRODE GROUP

11: X ELECTRODE

21: Y ELECTRODE    20: SECOND ELECTRODE GROUP

Y1
Y2
Y3
Y4

X1 X2 X3 X4 X5

Y1
Y2
Y3
Y4

11  B  A  21

STATE DETERMINATION DEVICE, STATE DETERMINATION METHOD, AND PROGRAM

BACKGROUND

The present disclosure relates to a state determination device, a state determination method, and a program, and particularly relates to a state determination device, a state determination method, and a program, which are for determining a state of an operating object.

In recent years, a pointing device has been in widespread use, as an input device of an information processing apparatus including a PC (Personal Computer) and a smartphone, for example. Examples of the pointing device include a touch panel, a touch pad, a mouse, and a TrackPoint. The pointing device detects position information of an input point specified by a position of an operating object (for example, refer to JP 2010-250770A).

SUMMARY

The position information of the input point which is input by the pointing device includes a noise component that is caused by various factors. Further, there may be cases in which a user's hand that operates the pointing device may be moved despite the user's intention. Accordingly, there were some cases in which, even though the user meant to keep the operating object still, the position information varied and the information processing apparatus operated in a way that was not intended by the user.

In light of the foregoing, it is desirable to provide a state determination device, a state determination method, a program, and a recording medium, which are novel and improved, and which are capable of enhancing determination accuracy as to whether an operating object is in a moving state or a still state.

According to an embodiment of the present disclosure, there is provided a state determination device which includes an input point acquisition section which acquires position information of an input point specified by an operating object, a reference region setting section which sets a reference region including the input point acquired by the input point acquisition section at a current time point, an input point-number acquisition section which acquires a number of input points acquired by the input point acquisition section in past and included in the reference region, and a determination section which determines, based on the number of input points acquired by the input point-number acquisition section, whether the operating object is in a moving state or in a still state.

According to such a configuration, the state determination device sets the reference region on the basis of the input point acquired at the current time point. Then, the state determination device counts the number of input points of the past included within the reference region, and determines, based on the number, whether the operating object is in the moving state or the still state. Accordingly, based on the movement state of the input point position within the region on the basis of the input point at the current time point, the state of the operating object is determined. A large number of input points within the reference region indicates that the period of time in which the operating object specifies a point within the reference region continues for long. That is, with increase in the number of input points within the reference region, the possibility of being in the still state increases. Note that, according to such a configuration, the state determination device can distinguish a case in which a slow moving operation is performed from a case in which a still operation is performed.

According to another embodiment of the present disclosure, there is provided a state determination method which includes acquiring position information of an input point specified by an operating object, setting a reference region including the input point acquired at a current time point, acquiring a number of input points acquired in past and included in the reference region, and determining, based on the acquired number of input points, whether the operating object is in a moving state or in a still state.

According to another embodiment of the present disclosure, there is provided a program for causing a computer to function as a state determination device which includes an input point acquisition section which acquires position information of an input point specified by an operating object, a reference region setting section which sets a reference region including the input point acquired by the input point acquisition section at a current time point, an input point-number acquisition section which acquires a number of input points acquired by the input point acquisition section in past and included in the reference region, and a determination section which determines, based on the number of input points acquired by the input point-number acquisition section, whether the operating object is in a moving state or in a still state.

According to the embodiments of the present disclosure described above, there can be provided the state determination device, the state determination method, the program, and the recording medium, which are novel and improved, and which are capable of enhancing determination accuracy as to whether the operating object is in a moving state or a still state.

DETAILED DESCRIPTION OF THE EMBODIMENT(S)

Figure 1:
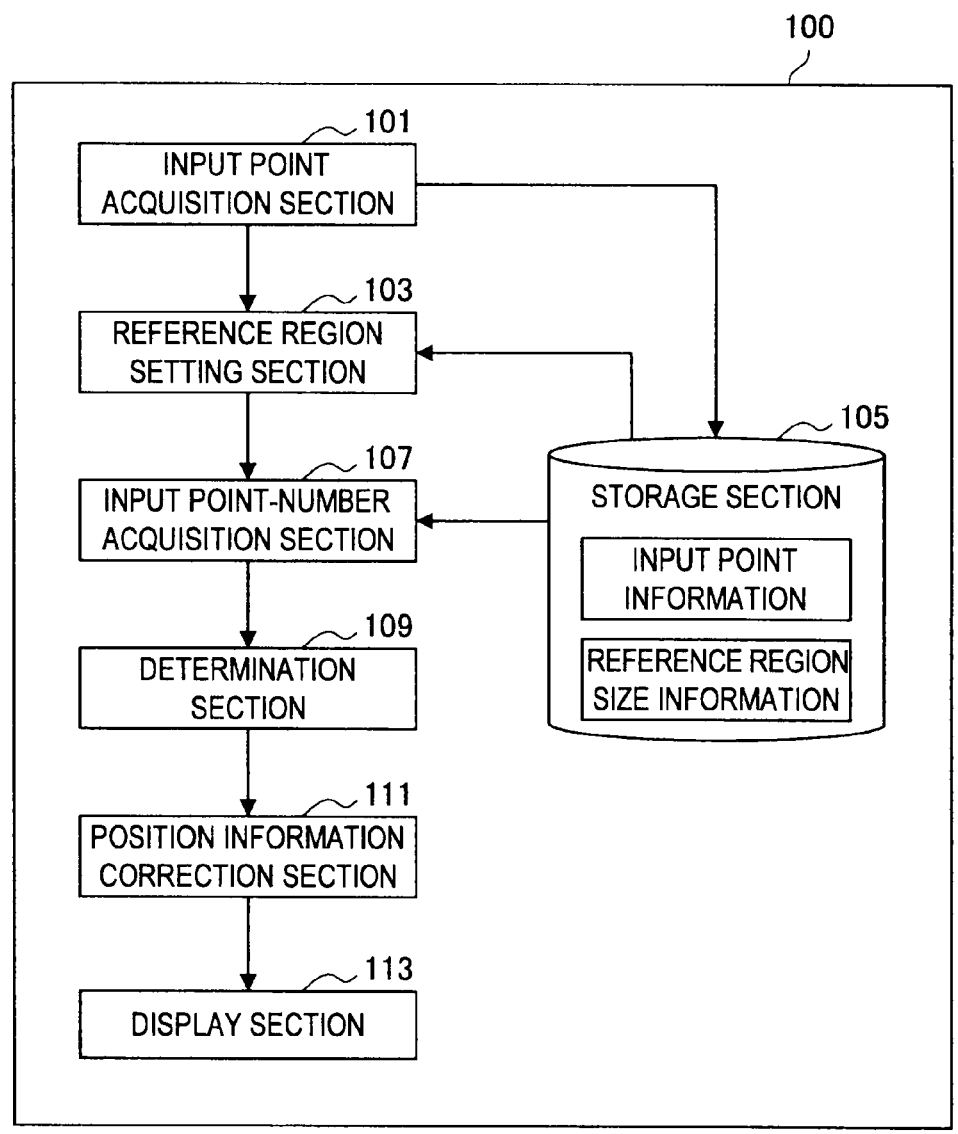
FIG. 1 is a functional block diagram of a state determination device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Configuration example of state determination device
2. Operation example of state determination device
3. Examples of effects
4. Modified example of state determination method

1. CONFIGURATION EXAMPLE OF STATE DETERMINATION DEVICE

Figure 2:
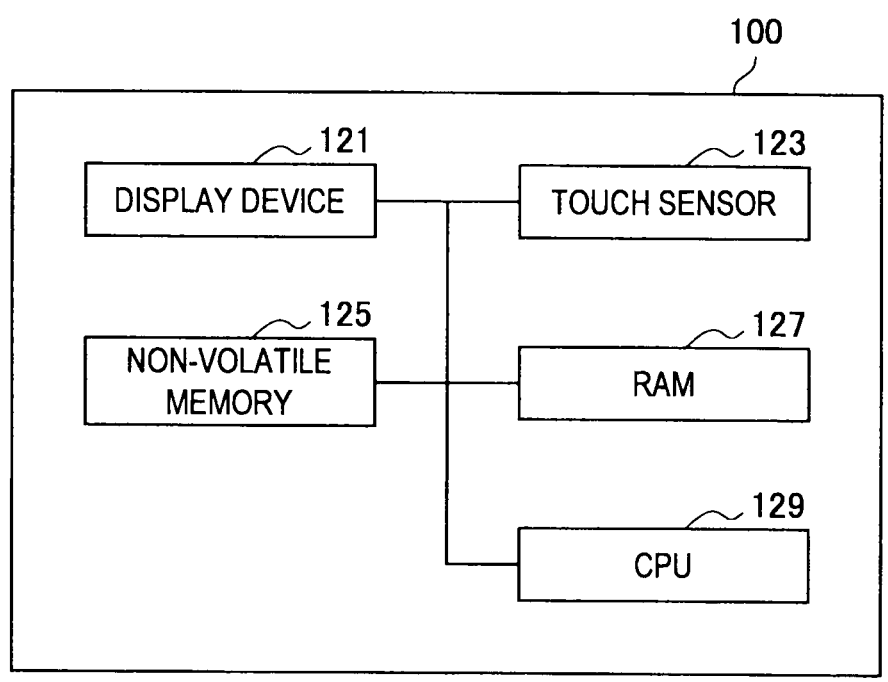
FIG. 2 is a hardware configuration diagram of the state determination device according to the embodiment.

First, with reference to FIG. 1 and FIG. 2, a schematic configuration of a state determination device according to an embodiment of the present disclosure will be described. FIG. 1 is a functional block diagram of a state determination device according to an embodiment of the present disclosure. FIG. 2 is a hardware configuration diagram of the state determination device according to the embodiment.

A state determination device 100 is an information processing apparatus operated based on position information of an input point acquired via a pointing device. The state determination device 100 may be, for example, an information processing apparatus such as a PC (Personal Computer), a mobile phone, a smartphone, a game device, a music reproduction device, a video processing device, or a consumer electronics device.

As described above, the position information of the input point acquired via the pointing device includes noise that is caused by various factors. For example, there was a case in which, even though a user meant to perform the input that intended to point one and the same point to a touch sensor, the position information of the input point output from the touch sensor varied which was caused by the shaking of the finger or the position of the touch sensor. Alternatively, there is also a case in which noise is included caused by device characteristics. For example, a capacitive touch sensor is an input device which detects a touch position based on the change in the capacitance of a plurality of electrodes. The capacitive touch sensor has a property that the noise is easily included in the case in which an operation position is at the boundary of the electrodes.

In this way, when the noise was included in the position information detected via the pointing device, there was a case where the position of the input point of the user's intention and the position of the detected input point are different from each other. In particular, even in the case where the user performs an operation intended as a still state, a coordinate value to be detected varies more or less in many cases. Accordingly, it is desired to accurately determine whether the intention of the user operation is a still state or the moving state.

Here, in the case of determining whether the intention of the user operation is the still state or the moving state, as for the method used for reducing the influence of noise, there is assumed a method involving setting a threshold and determining that the intention of the user operation is the moving state if the coordinates change to an extent equal to or more than the threshold. However, in the case of using such threshold, the displacement of the coordinate value is ignored until the change to an extent equal to or more than the threshold occurs. Therefore, particularly in the case of performing a slow operation, the user is not provided with appropriate feedback. Accordingly, there will be described hereinafter the configuration of the state determination device according to the embodiment of the present disclosure, which is capable of reducing the influence of noise and also appropriately distinguishing and determining between the moving state in which a slow operation is performed and the still state.

Referring to FIG. 1, the state determination device 100 mainly includes an input point acquisition section 101, a reference region setting section 103, a storage section 105, an input point-number acquisition section 107, a determination section 109, a position information correction section 111, and a display section 113. Further, the state determination device 100 may additionally include various types of functional sections which operate using position information output from the position information correction section 111, but the description thereof is omitted here.

The input point acquisition section 101 has a function of acquiring position information (for example, coordinate value) of an input point specified by an operating object. Here, the operating object represents a pointing device or an object for operating the pointing device (for example, a finger operating a touch sensor), for example. The input point acquisition section 101 can cause the storage section 105 to store the acquired position information as input point information, and can supply the reference region setting section 103 with the position information.

The reference region setting section 103 has a function of setting a reference region for determining whether the user operation is intended as the still state or the moving state. The reference region represents a part of the region in which the position information can be acquired. The reference region setting section 103 sets the reference region based on an input point (hereinafter, referred to as current input point) acquired by the input point acquisition section 101 at the current time point. Further, the reference region setting section 103 may set the reference region based on predetermined reference region size information. For example, the reference region setting section 103 may set the reference region having the position of the current input point (for example, the latest input point at the current time point) as its center. Here, the predetermined reference region size information can include information of the shape and the size of the reference region determined in advance. The information of shape and size may be a fixed value or may be a variable value. For example, the reference region size information may include a value which is set based on the device characteristics of the pointing device. For example, it is preferred that the reference region size information be determined such that the size of the reference region increases as more likely it is that the noise is included due to the device characteristics. More specifically, in the case where the pointing device is a touch sensor, for example, the reference region setting section 103 may set the reference region having the size which is determined in advance in accordance with the resolution of the touch sensor. In this case, it is preferred that the size of the reference region be smaller as the resolution increases. Further, the reference region size information may be determined by being associated with position information on the touch sensor. Here, in the case where the touch sensor is a capacitive touch sensor, it is likely that the noise is included in a grid boundary part. Therefore, the reference region size information may be determined such that the reference region size increases as it is nearer to the boundary part of the electrode. Further, the reference region setting section 103 may change the reference region size in accordance with the elapsed time during while the input operation is being continued since it has been determined as the still state, and with the variation in the coordinate value since it has been determined as the still state. For example, the reference region setting section 103 may reduce the reference region size as the time elapses. Further, the reference region setting section 103 may increase the reference region size with increase in the variation in the coordinate value. According to such a configuration, the transition to the moving state after once being determined to be the still state can be made smoothly. When the reference region is set, the reference region setting section 103 can supply the input point-number acquisition section 107 with information of the position, the size, the shape, and the like of the set reference region and the position information of the current input point.

The storage section 105 has a function of storing data. The storage section 105 may be, for example, a non-volatile memory such as a flash memory, an EEPROM (Electronically Erasable and Programmable Read Only Memory), an MRAM (Magnetoresistive Random Access Memory), a FeRAM (Ferroelectric Random Access Memory), and a PRAM (Phase change Random Access Memory), and a magnetic recording medium such as an HDD (Hard Disk Drive). In the present embodiment, the storage section 105 can store the input point information, which is a history of the position information of the input point acquired by the input point acquisition section 101, and the predetermined reference region size information.

The input point-number acquisition section 107 has a function of acquiring, among the input points of the past which are acquired prior to the current input point, the number of input points included within the reference region. The input point-number acquisition section 107 uses the information of the reference region supplied by the reference region setting section 103 and acquires the number of input points of the past included within the reference region. For example, specifically, the input point-number acquisition section 107 extracts, from among the pieces of input point information stored in the storage section 105, the input point(s) included within the reference region which is set by the reference region setting section 103, and counts the number thereof. The input point-number acquisition section 107 can supply the determination section 109 with the information of the acquired number of input points.

The determination section 109 has a function of determining, based on the number of input points acquired by the input point-number acquisition section 107, whether the operation performed by the operating object is intended as the still state or the moving state. The determination section 109 may perform the determination based on the change in the number of input points. Specifically, the determination section 109 can determine that it is the still state when the number of input points demonstrates an increasing tendency, and can determine that it is the moving state when the number of input points demonstrates a decreasing tendency. Further, the determination section 109 may determine that it is the moving state in the case where the position information acquired by the input point acquisition section 101 changes in a fixed direction. This is because the variation in the position information caused by noise is random and does not have a directivity in many cases, and the variation in the position information caused by the operation intended as the moving state has a directivity in many cases. Further, the determination section 109 may determine that the input point at the start of the operation using the operating object is the still state. According to such a configuration, redundant feedback can be reduced. The determination section 109 can supply the position information correction section 111 with the determination results.

The position information correction section 111 can correct the position information acquired by the input point acquisition section 101 based on the determination results obtained by the determination section 109. For example, in the case where the determination section 109 determine that it is the still state, the position information correction section 111 can correct the position information of the current input point based on the position information of the input point which is input immediately before the current input point. Then, the position information correction section 111 can correct the position information acquired by the input point acquisition section 101 such that the same position is being indicated while the determination section 109 determine that it is the still state. Alternatively, the position information correction section 111 may correct the position information of the current input point by estimating the position of the current input point based on the position information of the input point which is input immediately before the current input point and the variation in the input point of the past.

The display section 113 includes a display device and a display control section which generates a display screen to be displayed by the display device, for example, and has a function of providing the user with the display screen. The display section 113 can display the screen based on the position information corrected by the position information correction section 111.

Heretofore, an example of the functions of the state determination device 100 according to the present embodiment has been described. Each of the above structural elements may be configured using general-purpose members or circuits, or may be configured using hardware specialized for the function of each structural element. Further, the function of each structural element may be realized by reading out, by an arithmetic unit such as a CPU (Central Processing Unit), a control program from the recording medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing each function of the state determination device 100 according to the present embodiment as described above, and the computer program can be implemented in a personal computer or the like. Further, there can also be provided a computer-readable recording medium having the computer program stored therein. Examples of the recording medium include a magnetic disk, an optical disc, a magneto-optical disk, and a flash memory. Further, the computer program may be distributed via a network, without using the recording medium, for example.

Next, with reference to FIG. 2, an example of a hardware configuration of the state determination device 100 according to the present embodiment will be described.

The state determination device 100 mainly includes a display device 121, a touch sensor 123, a non-volatile memory 125, a RAM (Random Access Memory) 127, and a CPU (Central Processing Unit) 129. The display device 121 and the touch sensor 123 may be provided in a stacked manner.

The display device 121 is an example of an output device which outputs information. The display device 121 may be, for example, a liquid crystal display (LCD) device and an organic EL display (organic light emitting diode (OLED)) device.

The touch sensor 123 is an example of the pointing device, is provided in a stacked manner on the display device 121, and is a position detection device which detects the position of the operating object that comes into contact with or comes close to the operation surface of the touch sensor 123. The operating object is typically a finger of the user, for example, and is used by the user for inputting operation information. The touch sensor 123 may detect a two-dimensional position or a three-dimensional position of the operating object with respect to the operation surface.

The non-volatile memory 125 stores programs, various calculation parameters, and the like used by the CPU 129. As the non-volatile memory 125, a recording medium such as a ROM (Read Only Memory) and a flash memory can be used.

The RAM 127 temporarily stores programs used in the execution of the CPU 129 and parameters that appropriately change during execution thereof. The CPU 129 functions as an arithmetic processing unit and a control unit and controls the overall operation inside the state determination device 100 according to various programs. Further, the CPU 129 may be a microprocessor. Note that those pieces of hardware are connected with each other via a host bus configured from a CPU bus or the like.

The hardware configuration that has been described above is a configuration example for realizing respective functions shown in FIG. 1. For example, the display device 121 is controlled by a display control program executed by the CPU 129, and thus, the function of the display section 113 can be realized. Further, the function of the input point acquisition section 101 can be realized by the touch sensor 123.

2. OPERATION EXAMPLE OF STATE DETERMINATION DEVICE

Figure 3:
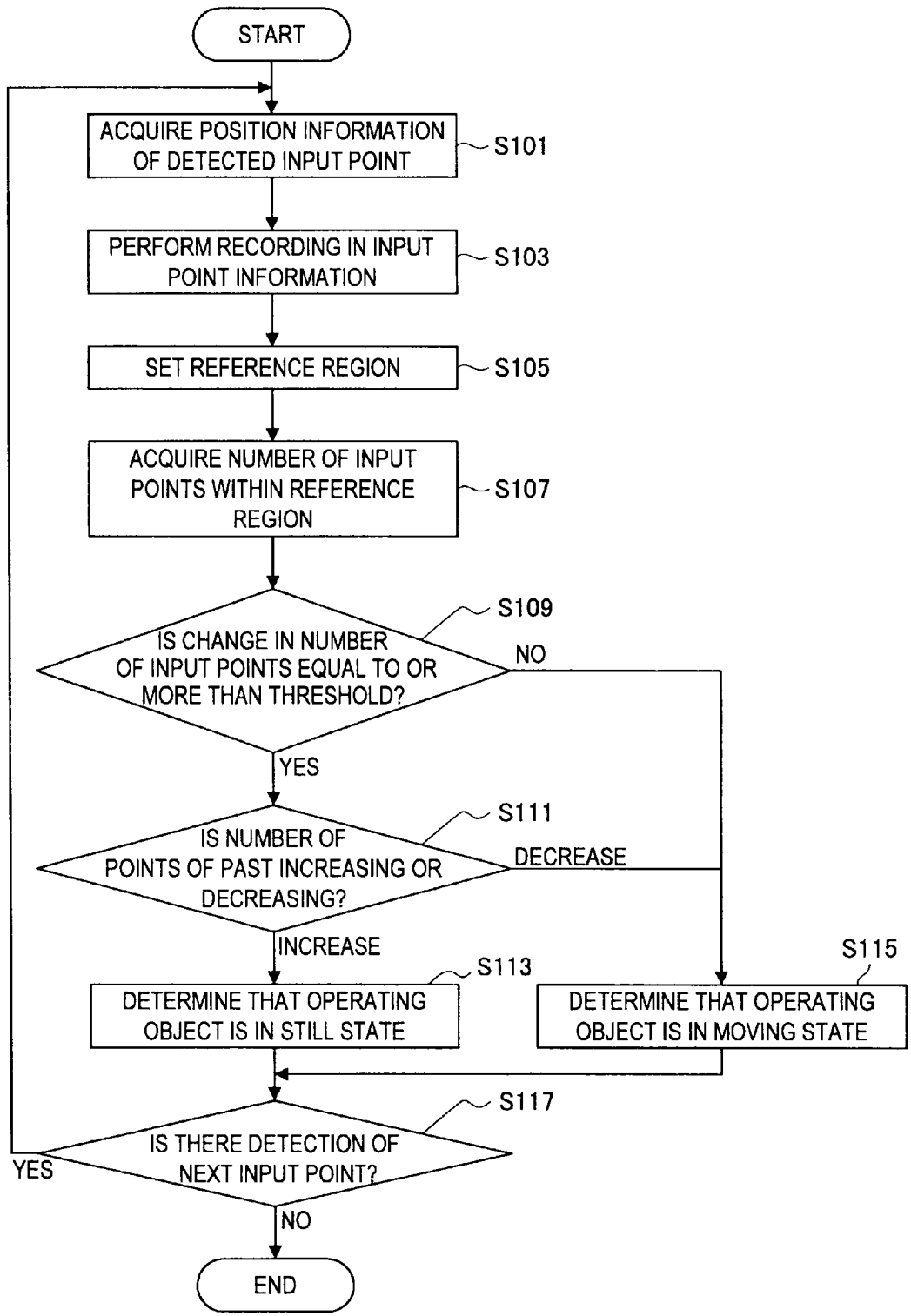
FIG. 3 is a flowchart showing an example of a state determination method according to the embodiment.

Next, with reference to FIG. 3, there will be described an operation example of the state determination device 100 realized by the configuration described above. FIG. 3 is a flowchart showing an example of a state determination method according to the embodiment.

First, when the user operates the touch sensor 123 with his/her finger, the input point acquisition section 101 of the state determination device 100 acquires position information of a detected input point (S101). Then, the input point acquisition section 101 records the acquired position information in the input point information stored in the storage section 105 (S103). In this case, the input point acquisition section 101 may record information of the date and time at which the position information is acquired.

Next, the reference region setting section 103 may set a reference region at a position based on the acquired input point (S105). In this case, the reference region setting section 103 sets the reference region based on reference region size information stored in the storage section 105. Here, it is assumed that the size and the shape of the reference region are fixed.

When the reference region setting section 103 sets the reference region, the input point-number acquisition section 107 acquires the number of input points of the past included within the set reference region (S107). Specifically, the input point-number acquisition section 107 extracts, from among the pieces of input point information stored in the storage section 105, the input point(s) included within the set reference region, and counts the number thereof. In this case, the input point-number acquisition section 107 may determine whether an input point is included within the reference region sequentially from the latest input point, and may repeat counting until it is found that an input point is outside the reference region. According to such a configuration, the rate of erroneous determination in the case of performing a turn-back operation can be reduced. Further, the input point-number acquisition section 107 may record the information of the acquired number of input points in the input point information. The information of the number of input points is used for finding out the change in the number of input points.

When the input point-number acquisition section 107 acquires the number of input points, next, the determination section 109 determines whether the change in the acquired number of input points is equal to or more than a predetermined threshold (S109). Here, in the case where it is determined that the change in the number of input points is not equal to nor more than the predetermined threshold, the determination section 109 determines that the operation performed by the operating object is intended as the moving state (S115). On the other hand, in the case where it is determined that the change in the number of input points is equal to or more than the predetermined threshold, then the determination section 109 determines whether the change in the number of input points is an increase or decrease (S111). Here, in the case where it is determined that the number of input points is increasing, the determination section 109 determines that the operation performed by the operating object is intended as the still state (S113). On the other hand, in the case where it is determined in the determination of Step S111 that the number of input points is decreasing, the determination section 109 determines that the operation performed by the operating object is intended as the moving state (S115).

Note that, in Step S109, whether the number of input points demonstrates an increasing tendency or a decreasing tendency is determined using the threshold, but the present technology is not limited to such an example. For example, it may also be determined to be an increasing tendency in the case where the increase continues for a predetermined number of times or more, or in the case where the ratio of the increase compared to the last time within a predetermined period is equal to or more than a predetermined value.

The input point acquisition section 101 determines whether there is detection of the next input point (S117), and in the case where the next input point is detected, the processing returns to Step S101. On the other hand, in the case where the next input point is not detected, the processing is completed.

3. EXAMPLES OF EFFECTS

Figures 4, 5:
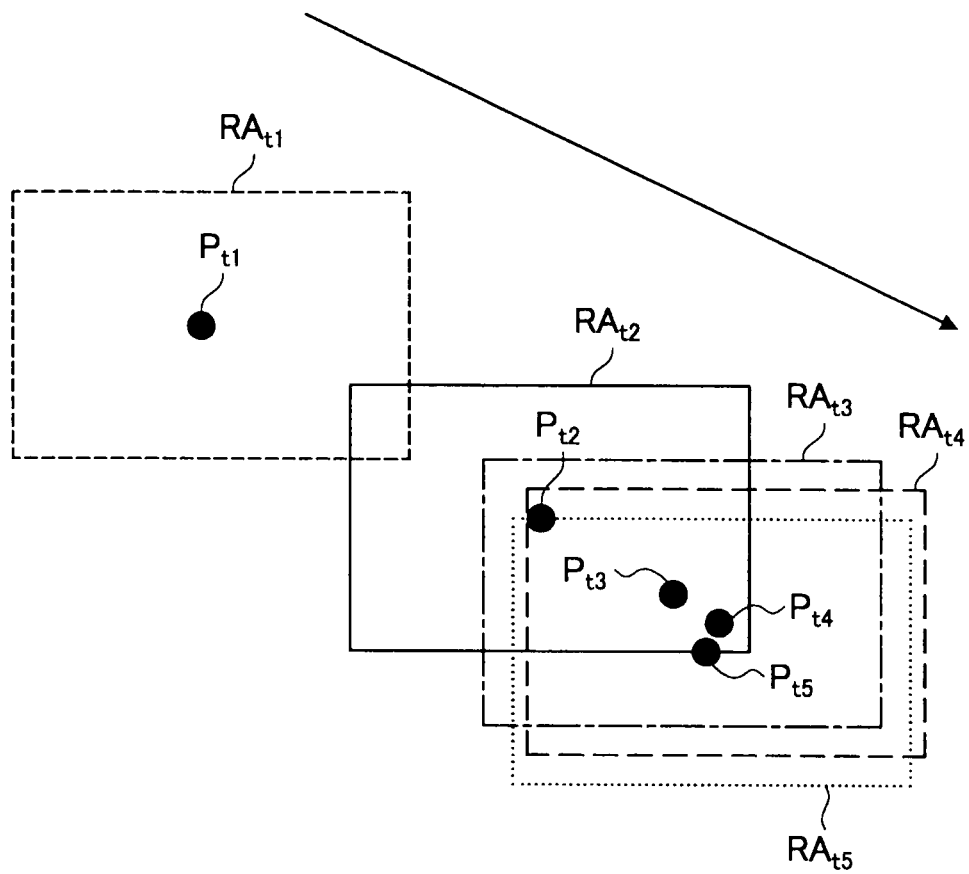
FIG. 4 is an explanatory diagram showing an example of input points and states of reference regions in a case in which a user intends to perform a still state operation in the embodiment.
FIG. 5 is a table showing change in the number of input points in the case of FIG. 4.
Figures 6, 7:
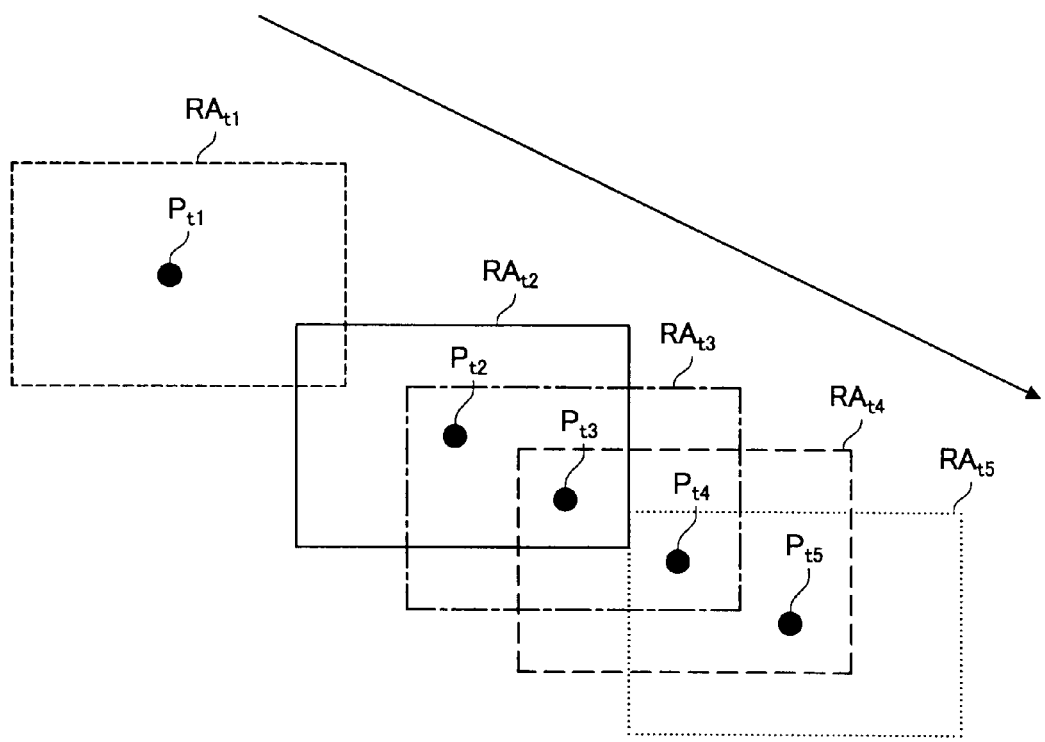
FIG. 6 is an explanatory diagram showing an example of input points and states of reference regions in a case in which the user intends to perform a slow moving state operation in the embodiment.
FIG. 7 is a table showing change in the number of input points in the case of FIG. 6.

Here, using FIGS. 4 to 7, examples of effects owing to the configuration of the state determination device 100 according to the present embodiment will be described. FIG. 4 is an explanatory diagram showing an example of input points and states of reference regions in a case in which a user intends to perform a still state operation in the embodiment. FIG. 5 is a table showing change in the number of input points in the case of FIG. 4. FIG. 6 is an explanatory diagram showing an example of input points and states of reference regions in a case in which the user intends to perform a slow moving state operation in the embodiment. FIG. 7 is a table showing change in the number of input points in the case of FIG. 6.

FIG. 4 shows the states of reference regions $RA_{t1}$ to $RA_{t5}$ in the case in which input points $P_{t1}$ to $P_{t5}$ are detected at times t1 to t5, respectively. FIG. 5 shows the transition of the number of input points included in each of the reference regions $RA_{t1}$ to $RA_{t5}$ in the case of FIG. 4.

In FIG. 4, after time t3, the user performs an operation intended as a still state. In this way, in the case where the user performs the operation intended as the still state, the position information changes randomly in many cases. Then, the input point to be detected is positioned within a region near the intended point.

On the contrary, in the case where the user performs an operation intended as a slow moving state, the displacement of the position information to be detected has a directivity in many cases. Then, in this case, even though the displacement is small, the position information of the input point continues to change keeping the directivity. Accordingly, the number of input points continues to increase less often. Therefore, state determination device 100 according to the present embodiment is capable of distinguishing the operation intended as the still state shown in FIG. 4 from the operation intended as the slow moving state shown in FIG. 6.

For example, in the case of determining that it is the still state when the displacement of the position information is equal to or less than the threshold, there was the possibility of being erroneously determined that it was the still state when the displacement of the position information of the input point of FIG. 5 was equal to or less than the threshold. On the contrary, in the state determination device 100 according to the present embodiment, the determination accuracy between the moving state and the still state is enhanced.

4. MODIFIED EXAMPLE OF STATE DETERMINATION METHOD

Figure 8:
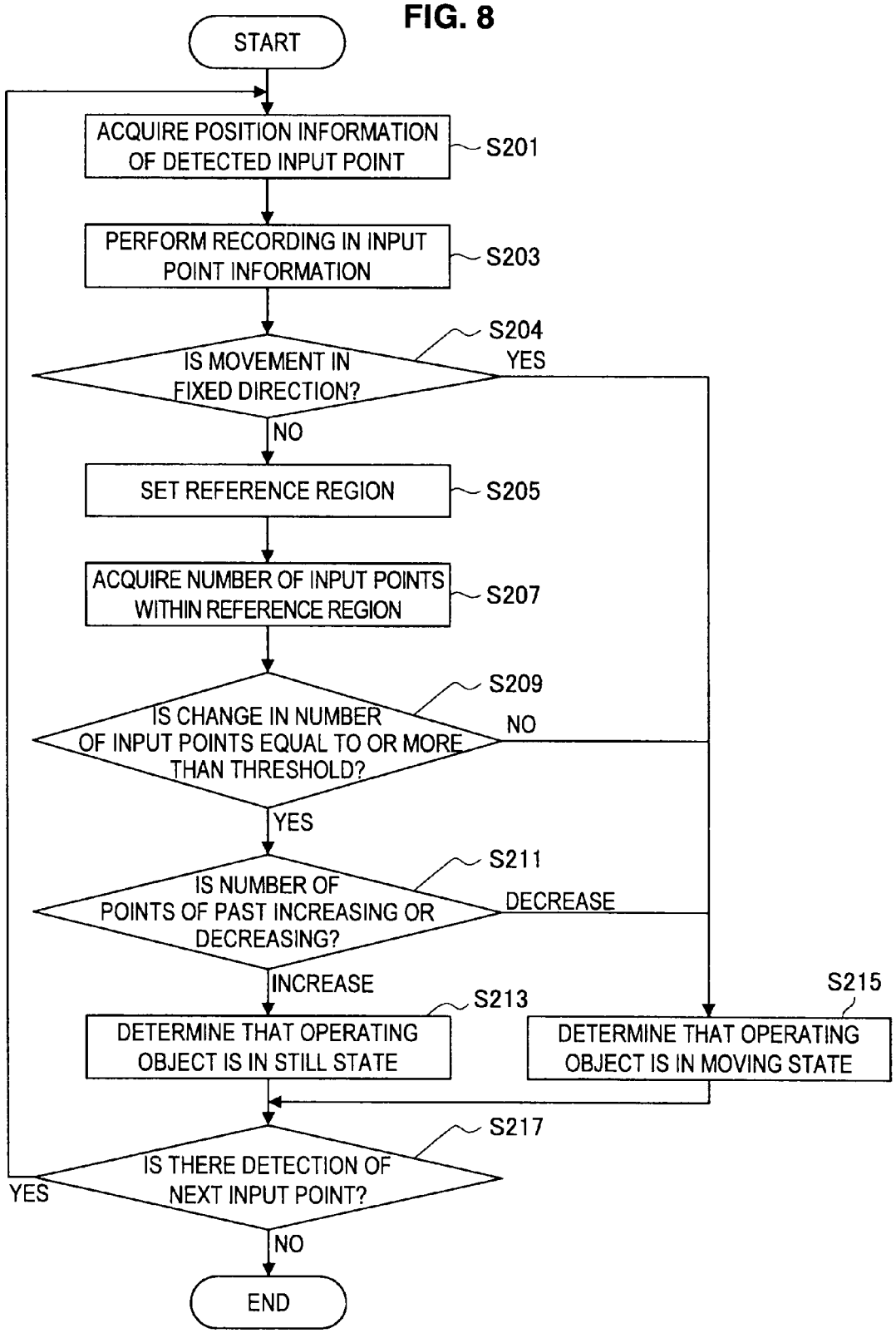
FIG. 8 is a flowchart showing a modified example of the state determination method according to the embodiment.
Figure 9:
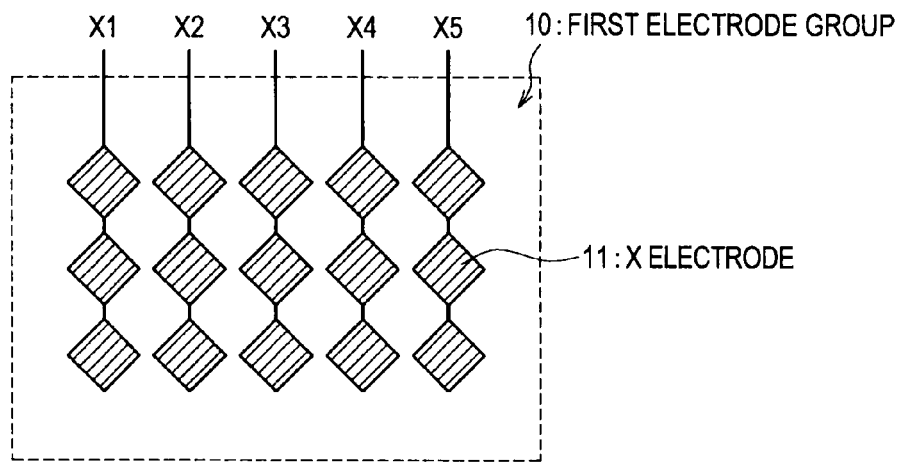
FIG. 9 is an explanatory diagram illustrating an example of reference region size information.
Figure 9:
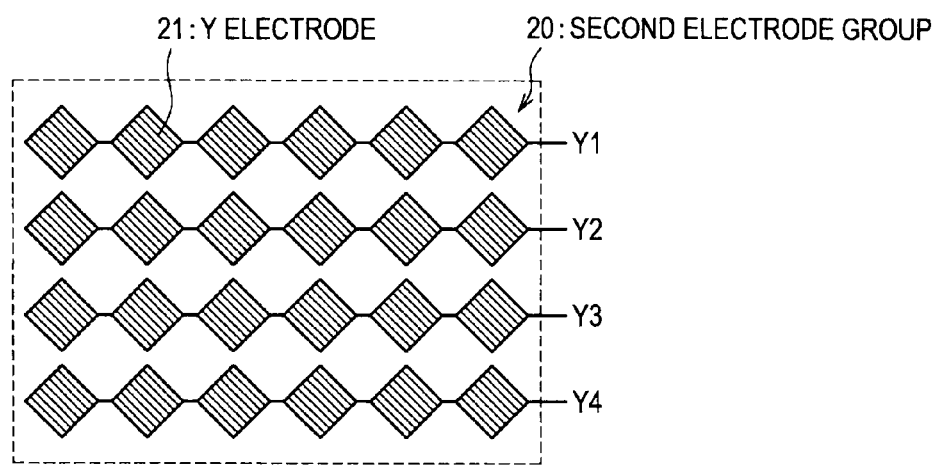
Figure 9:
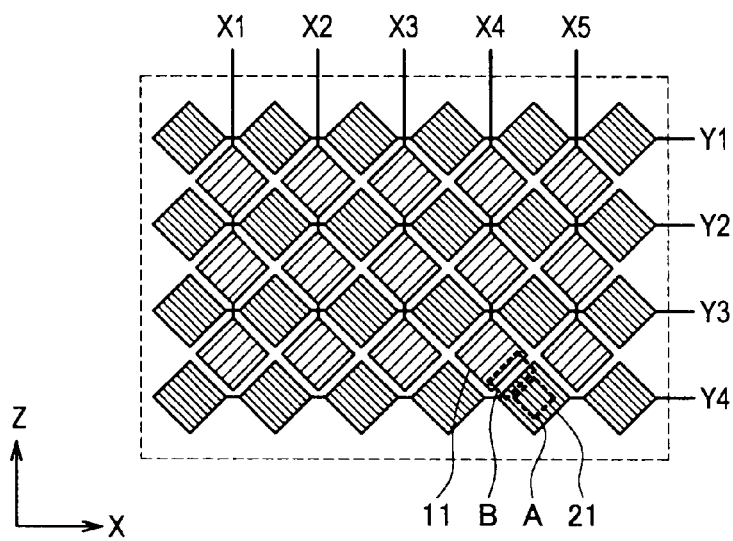

Next, with reference to FIG. 8 and FIG. 9, a modified example of the state determination method performed by the state determination device 100 according to the present embodiment will be described. In comparison to the state determination method described above, the present modified example partially differs therefrom in the criterion for setting the reference region by the reference region setting section 103 and in the criterion for the determination performed by the determination section 109. FIG. 8 is a flowchart showing a modified example of the state determination method according to the embodiment. FIG. 9 is an explanatory diagram illustrating an example of reference region size information.

First, when the user operates the touch sensor 123 with his/her finger, the input point acquisition section 101 of the state determination device 100 acquires the position information of the detected input point (S201). Then, the input point acquisition section 101 records the acquired position information in the input point information stored in the storage section 105 (S103). In this case, the input point acquisition section 101 may record information of the date and time at which the position information is acquired.

Here, the input point acquisition section 101 determines whether the acquired position information changes in a fixed direction (S204). Then, in the case where it is determined in Step S204 that the position information changes in the fixed direction, the determination section 109 determines that the operation performed by the operating object is intended as the moving state (S215).

On the other hand, in the case where it is determined in Step S204 that the position information does not change in the fixed direction, the reference region setting section 103 then sets a reference region at a position based on the acquired input point (S205). In this case, the reference region setting section 103 sets the reference region based on reference region size information stored in the storage section 105. Here, the size of the reference region varies according to device characteristics.

When the reference region setting section 103 sets the reference region, the input point-number acquisition section 107 acquires the number of input points of the past included within the set reference region (S207). Specifically, the input point-number acquisition section 107 extracts, from among the pieces of input point information stored in the storage section 105, the input point(s) included within the set reference region, and counts the number thereof. In this case, the input point-number acquisition section 107 may record the information of the acquired number of input points in the input point information. The information of the number of input points is used for finding out the change in the number of input points.

When the input point-number acquisition section 107 acquires the number of input points, next, the determination section 109 determines whether the change in the acquired number of input points is equal to or more than a predetermined threshold (S209). Here, in the case where it is determined that the change in the number of input points is not equal to nor more than the predetermined threshold, the determination section 109 determines that the operation performed by the operating object is intended as the moving state (S215). On the other hand, in the case where it is determined that the change in the number of input points is equal to or more than the predetermined threshold, then the determination section 109 determines whether the change in the number of input points is an increase or decrease (S211). Here, in the case where it is determined that the number of input points is increasing, the determination section 109 determines that the operation performed by the operating object is intended as the still state (S213). On the other hand, in the case where it is determined in the determination of Step S211 that the number of input points is decreasing, the determination section 109 determines that the operation performed by the operating object is intended as the moving state (S215).

The input point acquisition section 101 determines whether there is detection of the next input point (S217), and in the case where the next input point is detected, the processing returns to Step S201. On the other hand, in the case where the next input point is not detected, the processing is completed.

Here, in the setting of the reference region performed in Step S205, the reference region setting section 103 sets the size of the reference region in accordance with the device characteristics. For example, the reference region setting section 103 may use a standard size of the reference region which is determined in advance for each device. Further, for example, in a capacitive touch sensor, as shown in FIG. 9, a first electrode group 10 including a plurality of X electrodes 11 arranged in the X direction and a second electrode group 20 including a plurality of Y electrodes 21 arranged in the Y direction are provided in a stacked manner. The operating object comes into contact with or comes close to the touch sensor having such a configuration, and thus, the position information of the operating object is detected based on the change in capacitance detected by each electrode. In the touch sensor having such a configuration, the noise is more easily included in the position information to be detected in a region B which is near to the boundary between the electrodes compared to the position information to be detected in a region A which is near to the center of the electrode. For this reason, it is preferred that the reference region size information be set such that the size of the reference region becomes larger as it is at the position in which the noise is more easily included, that is, as it is at the position nearer to the grid boundary. Alternatively, comparing the peripheral part of the touch sensor with the central part of the touch sensor, the noise is more easily included in the peripheral part in many cases. In this case, it is desirable that the reference region size information be set such that the size of the reference region becomes larger as it is at the position nearer to the peripheral part of the touch sensor. The reference region setting section 103 may adjust the size of the reference region in accordance with a position on the touch sensor on the basis of the standard size.

Further, in the case where the size of the reference region varies, the size of the reference region may be changed based further on the time elapsed since the operation performed by the operating object has been once determined to be the still state, as described above. Further, the size of the reference region may be changed based further on the degree of variation of the position information since the operation performed by the operating object has been once determined to be the still state. In the case where the degree of variation of the position information is low, the size of the reference region is reduced, and hence, the change in states can be detected with high sensitivity when the operation intended as the moving state is performed next, and therefore, a smooth operation can be realized.

Additionally, the present technology may also be configured as below.

(1) A state determination device including:

an input point acquisition section which acquires position information of an input point specified by an operating object;

a reference region setting section which sets a reference region including the input point acquired by the input point acquisition section at a current time point;

an input point-number acquisition section which acquires a number of input points acquired by the input point acquisition section in past and included in the reference region; and a determination section which determines, based on the number of input points acquired by the input point-number acquisition section, whether the operating object is in a moving state or in a still state.

(2) The state determination device according to (1), wherein the input point acquisition section acquires position information of the operating object that comes into contact with or comes close to a touch sensor, and wherein the reference region setting section sets the reference region having a size in accordance with device characteristics of the touch sensor.

(3) The state determination device according to (2), wherein the reference region setting section sets the reference region having a size which is determined in advance in accordance with a resolution of the touch sensor.

(4) The state determination device according to (2) or (3), wherein the touch sensor is a capacitive touch sensor, and wherein the reference region setting section increases the size of the reference region as the reference region is nearer to a grid boundary of the touch sensor.

(5) The state determination device according to any one of (1) to (4), wherein, when the determination section determines that the operating object is in the still state, the reference region setting section reduces a size of the reference region as time elapses since the operating object has been determined to be in the still state.

(6) The state determination device according to any one of (1) to (5), wherein, when the determination section determines that the operating object is in the still state, the reference region setting section changes a size of the reference region in accordance with a degree of variation of the position information since the operating object has been determined to be in the still state.

(7) The state determination device according to (6), wherein, when the degree of variation is small, the reference region setting section reduces the size of the reference region.

(8) The state determination device according to any one of (1) to (7), wherein the determination section determines that the operating object is in the moving state when the position information acquired by the input point acquisition section changes in a fixed direction.

(9) The state determination device according to any one of (1) to (8), wherein the determination section determines that the operating object is in the still state when the number of input points increases by equal to or more than a predetermined threshold, and determines that the operating object is in the moving state when the number of input points decreases by equal to or more than a predetermined threshold.

(10) A state determination method including:

acquiring position information of an input point specified by an operating object;

setting a reference region including the input point acquired at a current time point;

acquiring a number of input points acquired in past and included in the reference region; and determining, based on the acquired number of input points, whether the operating object is in a moving state or in a still state.

(11) A program for causing a computer to function as a state determination device which includes an input point acquisition section which acquires position information of an input point specified by an operating object, a reference region setting section which sets a reference region including the input point acquired by the input point acquisition section at a current time point, an input point-number acquisition section which acquires a number of input points acquired by the input point acquisition section in past and included in the reference region, and a determination section which determines, based on the number of input points acquired by the input point-number acquisition section, whether the operating object is in a moving state or in a still state.

It should be understood by those skilled in the art that various modifications, combinations, sub-combinations and alterations may occur depending on design requirements and other factors insofar as they are within the scope of the appended claims or the equivalents thereof.

For example, in the embodiments described above, the touch sensor has been exemplified as the pointing device, but the present technology is not limited to such an example. For example, the present technology can be applied to a mouse, and a general pointing device using various types of sensors.

Note that in the present specification, the steps written in the flowchart may of course be processed in chronological order in accordance with the stated order, but may not necessarily be processed in the chronological order, and may be processed individually or in a parallel manner. It is needless to say that, in the case where the steps are processed in the chronological order, the order of the steps may be changed appropriately according to circumstances.

The present disclosure contains subject matter related to that disclosed in Japanese Priority Patent Application JP 2011-060843 filed in the Japan Patent Office on Mar. 18, 2011, the entire content of which is hereby incorporated by reference.

What is claimed is:

1. A state determination device comprising:

an input point acquisition section which acquires position information of an input point specified by an operating object;

a reference region setting section which sets a reference region including the input point acquired by the input point acquisition section at a current time point;

an input point-number acquisition section which acquires a number of input points acquired by the input point acquisition section in past and included in the reference region; and a determination section which determines, based on the number of input points acquired by the input point-number acquisition section, whether the operating object is in a moving state or in a still state.

2. The state determination device according to claim 1,
wherein the input point acquisition section acquires position information of the operating object that comes into contact with or comes close to a touch sensor, and
wherein the reference region setting section sets the reference region having a size in accordance with device characteristics of the touch sensor.

3. The state determination device according to claim 2,
wherein the reference region setting section sets the reference region having a size which is determined in advance in accordance with a resolution of the touch sensor.

4. The state determination device according to claim 2,
wherein the touch sensor is a capacitive touch sensor, and
wherein the reference region setting section increases the size of the reference region as the reference region is nearer to a grid boundary of the touch sensor.

5. The state determination device according to claim 1,
wherein, when the determination section determines that the operating object is in the still state, the reference region setting section reduces a size of the reference region as time elapses since the operating object has been determined to be in the still state.

6. The state determination device according to claim 1,
wherein, when the determination section determines that the operating object is in the still state, the reference region setting section changes a size of the reference region in accordance with a degree of variation of the position information since the operating object has been determined to be in the still state.

7. The state determination device according to claim 6,
wherein, when the degree of variation is small, the reference region setting section reduces the size of the reference region.

8. The state determination device according to claim 1,
wherein the determination section determines that the operating object is in the moving state when the position information acquired by the input point acquisition section changes in a fixed direction.

9. The state determination device according to claim 1,
wherein the determination section determines that the operating object is in the still state when the number of input points increases by equal to or more than a predetermined threshold, and determines that the operating object is in the moving state when the number of input points decreases by equal to or more than a predetermined threshold.

10. A state determination method comprising:
acquiring position information of an input point specified by an operating object;
setting a reference region including the input point acquired at a current time point;
acquiring a number of input points acquired in past and included in the reference region; and
determining, based on the acquired number of input points, whether the operating object is in a moving state or in a still state.

11. A non-transitory computer readable medium embodying program instructions for causing a computer to function as a state determination device which includes
an input point acquisition section which acquires position information of an input point specified by an operating object,
a reference region setting section which sets a reference region including the input point acquired by the input point acquisition section at a current time point,
an input point-number acquisition section which acquires a number of input points acquired by the input point acquisition section in past and included in the reference region, and
a determination section which determines, based on the number of input points acquired by the input point-number acquisition section, whether the operating object is in a moving state or in a still state.

* * * * *